Patented July 15, 1947

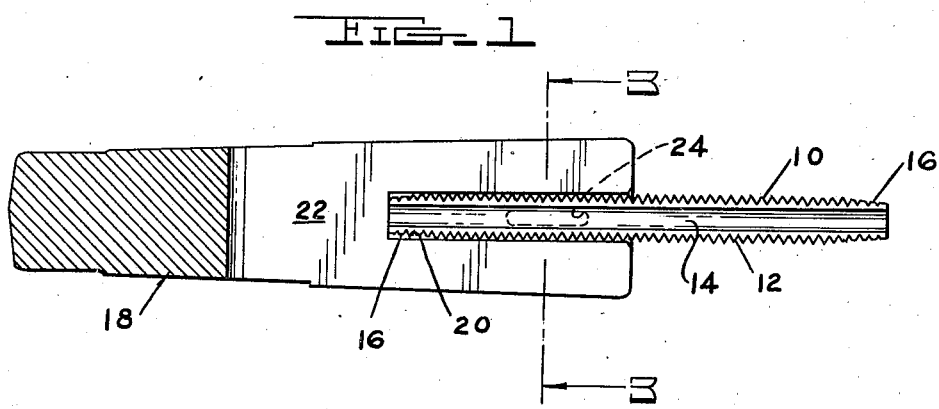
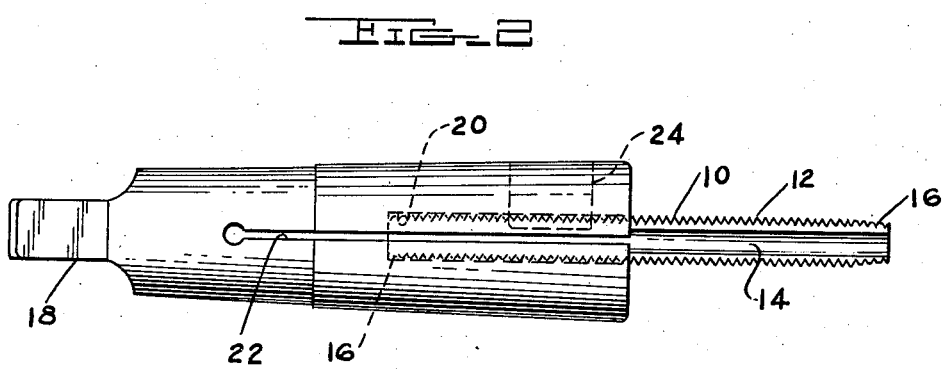
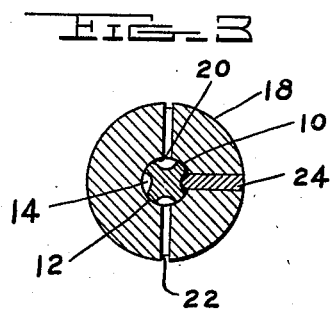

2,424,113

UNITED STATES PATENT OFFICE 2,424,113

TAP AND HOLDER THEREFOR

Harold Norberg, Detroit, and Hugo Smith, Pleasant Ridge, Mich., assignors to Plan-O-Mill Corporation, Hazel Park, Mich., a corporation of Michigan Application August 30, 1946, Serial No. 694,088

1 Claim. (Cl. 10—141)

This invention relates to a tap and holder therefor. The invention is more particularly concerned with a dual-life tap or other cutting tool wherein both ends of the tool may be formed as effective cutting ends and either end may be used in cooperation with an improved holder while the other end is performing a cutting operation.

Cutting tools such as taps, end mills and similar long cylindrical articles have heretofore been formed with a holding shank at the nonoperating end of the tool. This requires extra machining operations beyond those necessary to form the actual cutting portion of the tool.

According to the present invention, I construct a tap with flutes and threads formed throughout its entire length and with both ends properly shaped to act as a tapping tool. This permits not only more economical manufacturing of the tap originally but also when used with a proper holding fixture enables the life of the tool between sharpenings to be doubled since both ends must be dulled before the tool requires regrinding. In this way a double economy is obtained over that of prior art taps.

Figure 1 is a longitudinal cross section of a tap and holder embodying a preferred form of the present invention.

Figure 2 is a side view of the device of Figure 1.

Figure 3 is a cross section on line 3—3 of Figure 1.

The improved tap 10 comprises a straight cylindrical piece of steel formed with threads 12 and flutes 14 extending throughout its entire length. Both ends of the tap may be tapered at 16 in accordance with the usual practice. The tap 10 may be formed by centerless grinding threads upon a long bar of hardened steel stock after which the bar is cut into suitable lengths by an abrasive cutoff operation and the flutes 14 then formed by grinding.

The holder 18 comprises a body having a standard Morse taper shape and provided with a straight cylindrical recess 20 at its large end. The recess 20 is of a size to freely fit the outer diameter of the thread points of the tap 10. The body 18 is slitted as shown at 22 to permit contraction of the walls of recess 20 when the body is driven into the usual taper socket. Preferably, a single drive key 24 is provided extending into the recess 20 and shaped to engage one of the flutes of the tap 10 to prevent relative rotation.

It will be noted that the tap 10 extends into the recess 20 to the bottom surface thereof thus providing an arrangement wherein there is no tendency for the tap to slip rearwardly into the recess during use. Such an arrangement relieves the thread crests, which are in engagement with the walls of the recess, from any tendency to slip along the cylindrical walls and become damaged. The forward thrust is transmitted to the tap from the inner end thereof and rotational movement is imparted to the tap by the key 24 and no force whatsoever is transmitted to the tap through the threads themselves, the thread crest being used only to properly position the tap concentrically to the axis of the machine spindle.

It will be seen that when the tap and holder are driven into a taper socket, the tap is gripped firmly by the contraction of the walls of the recess 20. It is easy to maintain concentricity between the tap and holder by this method since the key 24 does not engage at the bottom of the flute of the tap. It serves merely to engage one of the side walls and act as a drive for rotational movement. When the tap becomes dulled at its operating end, the holder may be removed from its socket to free the tap from the recess 20. It may then be interchanged end for end and again inserted in place and used until the opposite end becomes worn.

It will thus be seen that the present invention provides a tap or other cutting tool which may be produced at substantially half the cost of conventional tools to do the same work since there is a saving both in machining operations and in material. The holder 18 may be used over and over with successive taps. At the same time, the entire tap may be formed in the hardened state thus eliminating many of the operations previously performed on conventional taps.

We claim:

A tapping tool comprising an externally tapered chuck adapted to be engaged in an internally tapered machine spindle, said chuck having a cylindrical recess concentric to said tapered portion and having a stop therein, said chuck also being longitudinally split, a tap of uniform diameter having helical threads intersected by longitudinal flutes located in said recess with one end abutting said stop and only its thread crests engaging the sides of said recess whereby contraction of said split walls forming said recess, when in said spindle, will accurately position said tap concentric to said spindle, and a driving key extending laterally into said recess a distance less than the depth of a flute and engaging in a flute of said tap.

HAROLD NORBERG.
HUGO SMITH.

REFERENCES CITED

The following references are of record in the file of this patent:

UNITED STATES PATENTS

| Number | Name | Date |
|---|---|---|
| 1,841,919 | Sederholm | Jan. 19, 1932 |
| 412,952 | Elterich | Oct. 15, 1889 |
| 1,258,239 | Oster | Mar. 5, 1918 |
| 965,970 | Wells | Aug. 2, 1910 |
| 273,409 | Voos | Mar. 6, 1883 |
| 1,023,389 | Olsen | Apr. 16, 1912 |
| 799,944 | Sager | Sept. 19, 1905 |
| 2,346,851 | Lloyd | Apr. 18, 1944 |
| 2,357,074 | Briggs | Aug. 29, 1944 |
| 766,747 | Vauclain | Aug. 2, 1904 |
| 490,273 | Doolittle | Jan. 24, 1893 |

FOREIGN PATENTS

| Number | Country | Date |
|---|---|---|
| 6,704 | Great Britain | May 19, 1886 |